US012807356B2

(12) United States Patent
Mayer et al.

(10) Patent No.: US 12,807,356 B2
(45) Date of Patent: Nov. 24, 2026

(54) BLANK SEPARATING DEVICE, CORRESPONDING PACKAGING MACHINE, AND METHOD FOR PRODUCING SEPARATED BLANKS FROM A STACK

(71) Applicant: Gerhard Schubert GmbH, Crailsheim (DE)

(72) Inventors: Steffen Mayer, Crailsheim (DE); Oussama Yangui, Crailsheim (DE)

(73) Assignee: Gerhard Schubert GmbH, Crailsheim (DE)

( * ) Notice: Subject to any disclaimer, the term of this patent is extended or adjusted under 35 U.S.C. 154(b) by 151 days.

(21) Appl. No.: 18/282,518

(22) PCT Filed: Apr. 8, 2022

(86) PCT No.: PCT/EP2022/059346

§ 371 (c)(1),
(2) Date: Jul. 15, 2024

(87) PCT Pub. No.: WO2022/214633

PCT Pub. Date: Oct. 13, 2022

(65) Prior Publication Data

US 2024/0375806 A1 Nov. 14, 2024

(30) Foreign Application Priority Data

Apr. 9, 2021 (DE) ......................... 102021108898.4
Jun. 9, 2021 (DE) ......................... 102021114889.8

(51) Int. Cl.

| | |
|---|---|
| ***B65B 43/18*** | (2006.01) |
| ***B25J 9/00*** | (2006.01) |
| ***B25J 9/04*** | (2006.01) |

(52) U.S. Cl.
CPC ........... *B65B 43/185* (2013.01); *B25J 9/0018* (2013.01); *B25J 9/044* (2013.01)

(58) Field of Classification Search
CPC .......... B65H 2701/1764; B65B 43/185; B65B 61/065
See application file for complete search history.

(56) References Cited

U.S. PATENT DOCUMENTS 5,048,811 A * 9/1991 Hochbein ................ B65H 3/46
271/106
5,564,893 A * 10/1996 Tacchi ................. B65G 47/902
414/797
(Continued)

FOREIGN PATENT DOCUMENTS

CA 2687847 6/2011
DE 2807823 8/1978
(Continued)

*Primary Examiner* — Howard J Sanders
(74) *Attorney, Agent, or Firm* — Head, Johnson, Kachigian & Wilkinson, PC

(57) ABSTRACT

In order to no longer have to store blanks (Z) separately in a blank magazine (20) and frequently refill the magazine manually, stamping sheets (SB) which contain a plurality of blanks (Z) that are still connected together by means of micro-connections (M) are delivered without stamped grids in a stacked manner on a Euro-pallet (14) for example, and the blanks (Z) are removed individually from the uppermost stamping sheet (SB) by a blank separating device (50) using a gripping tool (2), in particular by means of a separating robot (1) and a gripping tool (2) attached thereto.

23 Claims, 8 Drawing Sheets

(56) References Cited

U.S. PATENT DOCUMENTS

Figure 1A:
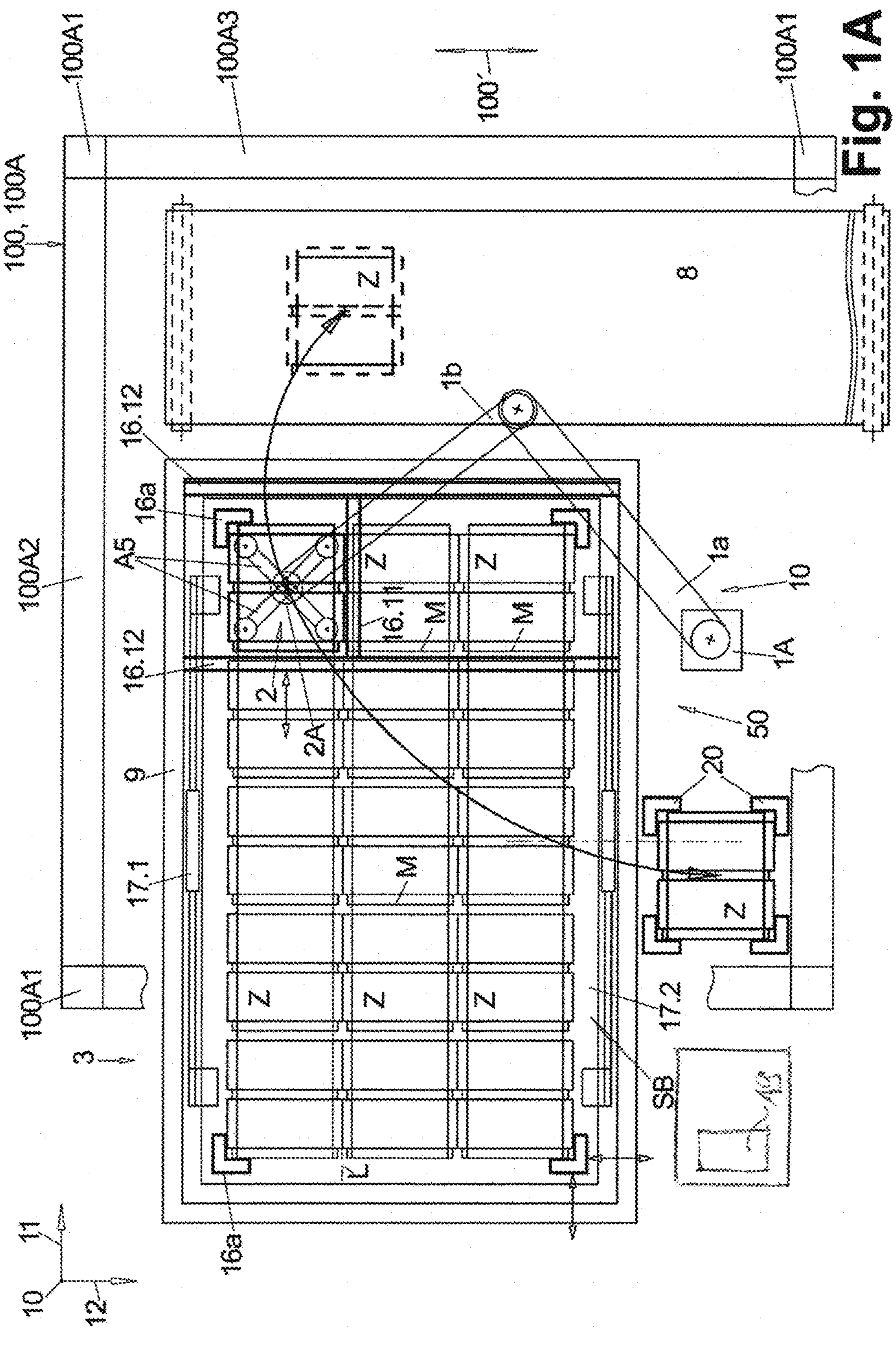

| | | | | |
|---|---|---|---|---|
| 5,927,582 | A | 7/1999 | Duecker | |
| 6,006,638 | A * | 12/1999 | Eltringham | B21D 43/20 83/402 |
| 2019/0299414 | A1 * | 10/2019 | Kato | B65C 9/30 |
| 2024/0090684 | A1 * | 3/2024 | Lovell | A47G 7/03 |

FOREIGN PATENT DOCUMENTS

| | | | |
|---|---|---|---|
| DE | 4001053 | | 7/1991 |
| DE | 10147360 | | 4/2003 |
| DE | 102012218990 | | 4/2014 |
| DE | 202014002616 | | 8/2015 |
| DE | 202018105228 | | 10/2018 |
| DE | 102018006600 | | 2/2020 |
| EP | 0334707 | | 9/1989 |
| EP | 0581188 | | 2/1994 |
| EP | 2476637 | | 7/2012 |
| GB | 581188 | A1 * | 2/1994 |
| JP | S53102741 | | 9/1978 |
| JP | 200372988 | | 3/2003 |
| JP | 2014221650 | | 8/2017 |

* cited by examiner

BLANK SEPARATING DEVICE, CORRESPONDING PACKAGING MACHINE, AND METHOD FOR PRODUCING SEPARATED BLANKS FROM A STACK

FIELD OF APPLICATION

The invention relates to the separation of flat blanks, in particular as packaging material, preferably from inherently rigid material, in particular cardboard material.

TECHNICAL BACKGROUND

Cardboard outer packaging is made from prefabricated, flat blanks by so-called erecting, i.e. folding up the side wall sections, for example, in relation to the bottom section of the blank, and fixing the individual sections, in particular the folded-up side wall sections, of the three-dimensionally shaped blank against each other, for example by gluing, whereby a cardboard box or cardboard box—usually still open at the top for filling—is produced.

While blanks made of film or thin paper are usually first produced in the packaging line by cutting from a web-shaped starting material immediately before erecting, this is hardly possible with cardboard box blanks.

Instead, the individual blanks, each of which will later make up a cardboard box, are stored in a stack in a cardboard box magazine, removed from there by a robot, for example, then guided through a folding tool, the so-called erector, in order to be erected into the required shape, and then placed on a transport element of the packaging machine.

The blanks are produced externally by the supplier of the blanks from large-format sheets whose area corresponds to a multiple of the area of a blank by punching or cutting and—usually still by the supplier—separated, whereby both the inner waste—i.e. stamping sheet parts, which initially still filled an enclosed hole in the blank, but which must be free for the production of the cardboard from the blank—is removed, as well as the outer waste between the individual blanks and around the, usually contiguous, blanks, which is often in the form of a so-called punching grid.

The individual blanks are of course arranged within the sheet in such a manner that as little waste as possible is produced.

However, as the capacity of such a blank magazine is limited, the blank magazine has to be refilled regularly by an operator or an empty blank magazine has to be exchanged for a full blank magazine and after the exchange the empty blank magazine has to be refilled again manually by the operator.

In addition, for a new packaging order for handling a differently designed blank for a differently designed cardboard box, the guides and supports of the blank magazine must be adapted to the new blank in each case, i.e. mechanically converted, which requires additional manual effort.

PRESENTATION OF THE INVENTION a) Technical Object

It is therefore the object of the invention to provide a method and a blank separating device for separating flat blanks also from rigid, thicker material, in particular up to 5 mm thick, in particular cardboard material, in which the manual effort for refilling a magazine with separated blanks is avoided as far as possible.

b) Solution of the Object

This object is solved by the features of claims 1, 15 and 18. Advantageous embodiments result from the subclaims.

First, some terms should be defined:

In the context of the present description, a blank is understood to be a sheet in the form of a shape-retaining, plate-shaped part, usually consisting of cardboard material, which can be formed into a three-dimensional package, usually a three-dimensional box or crate—with or without a lid—by bending sections along usually preformed bending lines.

A group of blanks that the robot removes from the stamping sheet at once is understood to be a subset of the entire stamping sheet, so that this group contains fewer blanks than the entire stamping sheet.

Within the group, the blanks can be adjacent blanks still connected by micro-joints or blanks that are distant from each other within the stamping sheet.

In the context of the present description, a stamping sheet is understood to be the blanks which are still coherent in one plane, punched out of a sheet, with nominal tear points—the micro-joints, possibly called holding points—in between, whereby, however, the waste not required for the blanks, in particular the punching grid around the blanks, has already been removed from the original sheet.

The micro-joints are narrow bridges between the blanks left in place during the punching process, which are of course also made from the material of the stamping sheet.

Therefore, in the following description, we will only speak of micro-joints, which, however, should be understood to mean all types of nominal tear points, even if they do not consist of individual, adjacent micro-joints, but instead consist, for example, of a continuous, but very thin connecting strip between the blanks.

A top-side gripper is understood to be any type of gripper that only requires the top side of the product to grip, not the side surfaces or even the bottom side of the product. A top-side gripper therefore only grips the top side of the product. These can be adhesion grippers that work by means of adhesion forces or the widely used suction cups that are acted upon by suction air. In order to simplify the description and claims, only suction cups are predominantly mentioned there, which is intended to include all types of topside grippers.

With regard to the stack of die-cut sheets, it should be made clear that although the die-cut sheets have in principle a constant thickness over their entire length, settlement phenomena can nevertheless occur, particularly due to the large number in a stack, which mean that the top of the uppermost die-cut sheet is not exactly flat, but sags somewhat or can also be somewhat arched in the middle.

When talking about a gripping plane or punching sheet plane where the several top grippers of the gripping tool are located or where the top punching sheet is located, the gripping tool must be able to cope with this unevenness, and so must the hold-down device(s).

With regard to the method of separating flat blanks from a stamping sheet with several blanks contained therein, lying in one plane and connected to one another via predetermined tear points, in particular micro-connections, the object is solved in that one blank, in particular only one individual blank, is gripped from the first stamping sheet of the stack, i.e. in the case of a vertical stack the uppermost stamping sheet, and is moved out of this stamping sheet transversely to its sheet plane, the predetermined tear points to the adjacent blanks then tearing off.

For this, of course, the blank in question must be held with sufficient force.

Nevertheless, the relevant blank is usually not gripped and held positively, i.e. not by means of mechanical grippers, but preferably non-positively, in particular by means of one or more suction cups that engage on the upper side of the relevant blank.

Such a gripping tool comprising one or more suction cups can be attached to a robot arm of a robot, for example.

Tearing off from the surrounding blanks will usually only work if these are held—preferably as closely as possible in the vicinity of the blank to be separated—and are secured against lifting upwards, especially in the case of stacked die-cut sheets, i.e. are held on the top of the rest of the stack by a hold-down device, for example.

In order to effect a clean tear-off at the target tear-off points, and not away from them, the holding areas in which the blank is held on a gripping tool, in particular a suction cup, should be as close as possible to the target tear-off points, as should the hold-downs.

Furthermore, it can be advantageous not to move the blank out of the stamping sheet plane perpendicularly to the stamping sheet plane, since in this case all target tear points must be torn off at the same time, but to first move the blank to be separated out of the stamping sheet plane in one of its end regions, in particular to lift it from the stack, and from there continuously to the other end region, so that the individual target tear points along the peripheral edges of the blank tear off as successively as possible, for which only a relatively low holding force of the at least one suction cup is required.

The production of individual blanks may include pre-processing steps, such as printing blanks before or after punching the stamping sheet from the sheet, preferably while the sheet is still whole.

Further pre-processing steps can include making fold lines in the blanks around which the individual parts of the blank are to be folded against each other.

Above all, however, it is necessary to remove waste from the sheets, because in most cases the die-cut sheets should not contain any waste material apart from the continuous blanks.

Preferably, a die-cut sheet comprises not only a part of the blanks produced in a sheet, but all blanks from a sheet, which facilitates the creation of the die-cut sheet.

The die-cut sheets are made as large as possible by the manufacturer anyway, as this keeps the effort for printing and die-cutting low. Preferably, standardised sizes, for example 0b or 3b, are chosen for the bends.

Preferably, the size of the sheet is selected so that the stamping sheets produced from it just fit onto a standardised pallet, in particular a Euro pallet, and the Euro pallet filled with a stack of stamping sheets can be moved into or up to the blank separating device and deposited there as a supply of stamping sheets.

Preferably, the stack can be adjusted in height according to the decreasing stack height when separating the blanks so that the top stamping sheet is always at approximately the same height.

Preferably, the separated blank is checked for quality characteristics, in particular with regard to shape and/or size and/or quality of the torn-off peripheral edges and/or quality of its printing, which is preferably done before the separated blank is introduced into a blank magazine or into the processing sequence of a downstream machine.

Preferably, the cut blank should hang on the gripping tool, such as the robot, in a predefined target position after it has been cut out.

For this, at least the knowledge of the actual position of the blank and thus of the entire stamping sheet is necessary before gripping and separating, for which its actual position should be determined and communicated to the gripping tool via the control system for correct gripping by the gripping tool. It is better to bring the entire stamping sheet into a predetermined target position before gripping and cutting out the first and each subsequent blank.

However, since the separated blanks do not always take up exactly the same position after the separating process, especially not at the gripping tool, because the tear-off process cannot be reproduced 100% exactly, a position correction of the individual blank can be useful:

For example, the actual position of the blank placed on its support surface, such as a conveyor belt, is first determined and then corrected, for example with the aid of a gripping tool or as part of a subsequent transfer process of the individual blank, such as on the feed conveyor to a cardboard box erector.

If experience shows that the deviation of the actual position from the target position is small, it may be possible to dispense with determining the actual position and still reliably reach the target position, for example by aligning the blank, especially during further transport on a conveyor, by means of mechanical guiding devices such as guide plates and, if necessary, also positioning it in the longitudinal direction via a longitudinal stop.

If the separation of the blanks is carried out as part of the operation of a packaging machine, which also includes the production of cardboard boxes from blanks, the respective separated blank is preferably processed further immediately.

Optionally, a supply of already separated blanks is kept available from which the packaging machine can be fed if the separation process from the stamping sheets is interrupted, for example because a new stack of stamping sheets has to be inserted into the supply station.

Preferably, a stack of stamping sheets is placed in the supply station for this purpose together with the delivery bundle. As a rule, the die-cut sheets are delivered stacked and fixed on a Euro pallet so that the entire loaded pallet can be placed in the supply station with a forklift truck and only the fastenings, such as the tension belts, have to be detached from the stack.

With regard to the blank separating device, this comprises on the one hand a supply station for receiving a—preferably vertical—stack of plate-shaped stamping sheets, as well as a separating robot for transferring one, in particular only one, blank from the preferably foremost or uppermost stamping sheet of the stack in the supply station to a downstream transport system of a downstream machine or into a blank magazine. Furthermore, a control system is provided to control the moving parts of the separating stop.

According to the invention, therefore, the storage station does not hold individual blanks in stacks, but rather entire die-cut sheets, each with several blanks lying in one plane and still connected to one another via predetermined tearing points, in particular micro-connections, in which, however, the waste between the blanks, be it the surrounding die-cutting grid or also internal waste inside a blank, is preferably already removed from the stacked die-cut sheets.

The separating robot—by which is meant any type of handling device—and in particular the gripping tool attached to it, is designed as a separating robot, so that it is able to initially grasp either a single blank or a group of blanks—connected to one another or objected to one another in the punching sheet—from the uppermost punching sheet of the stack and to separate them from the adjacent blanks by moving them out of the plane of the punching sheet, tearing off the target tear points.

This is done one after the other for all blanks of the uppermost cutting sheet and then for all further cutting sheets until the last blank remains, which then no longer has to be torn off from neighbouring blanks, but only has to be gripped and transported away.

As a rule, the separating robot has only a relatively limited working range in the height direction, at least less than the height of a full stack.

One possibility is that the separating robot is equipped or converted in such a way that it has a working range in the height direction corresponding to the height of a full stack. Either the separating robot as a whole, i.e. including its robot base, is adjusted in height for this purpose or the entire robot mechanics, in particular the robot arm, is dimensioned in such a way that it can cope with this vertical working range.

In the case of a serial robot arm, in which the upper arm and the lower arm of the robot arm can be swivelled in a horizontal plane, the vertical strut attached to the free end of the lower arm, which carries the tool at its lower end, could then have a corresponding length.

Another possibility is that there is a lifting device which moves the entire stack, preferably including the bundle, such as the pallet on which it rests, from bottom to top according to the decreasing stack height, so that the top stamping sheet is always at approximately the same height. Preferably, this lifting device is attached to the base frame of the storage station.

The robot tool can have a mechanical gripper, whereby access to a single blank on several opposite sides can be difficult or impossible, as it is still connected to adjacent blanks via the target tear points.

For this reason, the robot tool preferably comprises one or more top side grippers, for example suckers, which are then preferably arranged in a horizontal gripper plane—in the following, we will only speak of suckers, which is intended to include all types of top side grippers—which can be placed on the top side of the blank to be separated and hold it in such a way that it is also possible to tear it out of the rest of the stamping sheet.

In order to be able to adjust the tool to differently sized and differently shaped blanks, the position of the suction cups—viewed from above—on the tool base body is preferably adjustable, in particular radially adjustable relative to its central area, preferably controlled and automatically adjustable.

A first solution can be that each suction cup is attached to a suction arm running radially with respect to the tool body and its central, central area and is either adjustable in its position along the suction arm or is arranged at the end of the suction arm and the suction arm itself is adjustable in length.

The cantilever direction of the suction arms in relation to the basic tool body can also be variable by swivelling around an upright axis.

Alternatively, each suction cup can be adjustably mounted in or along a suction cup guide which extends preferably radially with respect to the central middle region of the tool body.

An alternative solution is that the tool body comprises a suction cup support plate with a plurality of attachment devices for suction cups, for example by the suction cup support plate being a perforated plate with a large number of through-holes arranged in a two-dimensional grid, into each of which a suction cup can be inserted and locked with very little work, and in this way the positions of the suction cups can be adapted to the size and shape of the blank.

This is because the tear-off at the target tear points will work better the closer the individual suction cups are positioned to the target tear points and also the closer the hold-downs are positioned to the target tear points.

In a further embodiment, the robot or the tool can also be designed in such a way that—in particular after the activation of the suction cups and thus the gripping of the blank—the suction cup plane can be adjusted to an inclined position relative to the upper side of the stack, in particular to the horizontal, and thus the blank to be detached can be detached starting at one end region and continuing towards the other end region, in the case of a rectangular blank preferably diagonally from one corner of the blank to the opposite corner.

The robot tool can also be designed in such a way that, in the case of several suction cups, the individual suction cups can be activated in a specific sequence, either individually or in groups.

This is because a suction cup does not have to make contact with a surface, in this case the upper side of the blank, in order to suck it in. Instead, suction also works when the suction cup is still 1-2 mm away with its suction plane, i.e. its opening plane, which is defined by the suction lip.

Since the displacement by such a distance transverse to the punching sheet plane is already partly sufficient for the target tear-off points located in the vicinity of this suction point to tear off, the target tear-off points can be torn off along the successively activated suckers by successively activating the suckers, which thus has approximately the same effect as inclining the suction plane together with the sucked blank relative to the top side of the stack.

In one design, the robot tool can be constructed in such a way that the suction cups can be moved upwards, either individually or in groups, from a common suction cup level in which all the suction cups are in the position that is extended furthest downwards. This can also achieve the aforementioned effect.

Mechanical means for adjusting the suction cups between the upper and lower end position are not necessarily required, but this can be done pneumatically by the negative pressure impact when activating the suction cups, for example by installing a pneumatic cylinder or folding bellows—for example sleeve-shaped—between the base body and the suction cup.

In addition to the robot designed as a separating robot, such a blank separating device comprises, according to the invention, a holder for the remainder of the stamping sheet, in particular a hold-down device, in order to prevent the remainder of the stamping sheet from being lifted from the stack next to the blank to be separated and thus to prevent the predetermined tearing points from being torn off.

In the case of several hold-downs or one large-area hold-down, the at least one underside of the hold-down should lie in a horizontal and, in particular, common hold-down plane.

Since the often approximately rectangular blanks are usually only connected to adjacent blanks on one long side and one wide side, an L-shaped hold-down is preferably used as the hold-down, the two legs of which are arranged horizontally along near the long side and near the wide side.

With regard to the arrangement, a first possibility is that the hold-down is fastened to the base frame of the storage station, preferably fastened in a way that is at least adjustable in height. It is irrelevant which mechanism is used for this. A robot could also be used for this.

As long as the uppermost stamping sheet is always held at approximately the same height by means of a lifting device, irrespective of the current height of the stack of stamping sheets, the hold-down device only requires a small lift in height and can be force-controlled, in particular when moving to the lower position, the hold-down position.

The robot must be able to access the top of the stack. Since the working area of the robot is often relatively small in height, as the robot with its robot base is fixed at a fixed height to the base frame of the packaging machine and the robot arm itself only allows a limited height adjustment of the tool, but a full stack of stamping sheets can rise up to approximately the height of the base frame, either the whole stack, in particular the pallet on which it stands, must be able to be moved in height in a controlled manner or the robot base must be able to be moved on the base frame of the packaging machine.

If the delivered stack of stamping sheets is brought into the supply station together with the pallet, this should preferably not have its own floor and thus no step at the entrance, so that the pallet or the stack of stamping sheets can be driven into the supply station by a corresponding conveyor vehicle on the floor on which the separating stop is also standing.

Lifting means to guide the entire stack, in particular the pallet on which it is standing, upwards in height so that the uppermost stamping sheet is always at the same height can then, for example, only be attached to lateral columns of the base frame of the separator, in particular its supply station, or of the packaging machine, or project down from its upper end.

Alternatively, the separating robot is attached to the base frame of the packaging machine in a controlled, height-adjustable manner so that it can always access the top of the stack.

However, the at least one hold-down must also be adjustable in at least one, preferably both, preferably perpendicular to each other, horizontal transverse directions, in particular relative to the base frame of the supply station and preferably automatically and controllably adjustable to adapt to the position of the respective blank to be removed in the stamping sheet, but also in the event of a format change to adapt to the new shape or size of the individual blank as well as the overall design of the stamping sheet.

One possibility is that the hold-down consists of several hold-down bars, for example one or two parallel hold-down bars, which run in a horizontal transverse direction, for example the X-direction, and can be moved by means of corresponding guides in another transverse direction, e.g. perpendicular to it, the Y-direction, along either the base frame of the storage station or an e.g. frame-shaped hold-down frame, in particular automatically controlled.

In addition, there can also be one or two hold-down bars running in the other transverse direction, in this case the Y-direction, which can be arranged between the two first-mentioned hold-down bars, in particular automatically controlled, at any position in their direction of extension, so that all hold-down bars are as close as possible to the circumference of the blank to be detached.

A second possibility is to attach the blank holder to the tool body of the robot tool, which of course increases its weight and reduces its cycle times. Preferably, several hold-downs can be arranged on the basic tool body and/or be adjustable in their position relative to the basic tool body.

A preferred solution would then be that, for example, an individual hold-down device can be assigned to each suction cup, whereby in particular the assigned hold-down device can be arranged and fastened to the corresponding suction cup radially further out with respect to the basic tool body, in particular at an adjustable distance.

If, for example, the individual suction cups are arranged on a suction cup arm or along suction cup guides, which in particular each run radially, the hold-down device can be located there at a distance further out, so that under certain circumstances the suction cup and hold-down device can be radially adjusted together rather than separately in order to adapt to a new shape or size of a blank to be handled.

In order to prevent the uppermost stamping sheet(s) of the stack from slipping undesirably, the supply station may comprise a mechanical supply aligner which mechanically holds at least the uppermost stamping sheet(s), in particular the entire stack of stamping sheets, in a desired position in the horizontal direction or brings it into the desired position, which is usually done by means of adjustable stops which rest or can rest against the side of the stack or at least the uppermost stamping sheet.

Such a mechanical supply aligner and in particular its lateral stops can be

- either on the storage base frame
- or on the hold-down base frame, in particular the hold-down frame
- or on the basic tool body,
- whereby in practice primarily the first two variants come into question.

Alternatively or additionally, instead of mechanically aligning at least the uppermost stamping sheet into a desired position in the horizontal plane, the position of the stamping sheet and thus also of the blank to be separated from it can be determined by means of a—preferably non-contact—position scanner, so that the position of the blank to be gripped is known to the separating robot and it can access it in a targeted manner. The position scanner can be attached to the tool or to the base frame of the separating stop.

For this purpose, the position scanner is usually connected to the control of the cut-to-size separator, which processes this data, if necessary, and passes it on to the separating robot.

Furthermore, there can be an inspection scanner—preferably also operating without contact—which can inspect the blank, which has already been separated, i.e. detached from the stamping sheet, for quality features, for example with regard to its shape and/or size and/or the quality of its outer edges and/or the quality of its printing and/or the motif of the printing.

Such a test scanner can either be present at a separate test station that is not the same as the supply station or another station. However, it should be located in the gripping area of the separating robot so that it can deposit the separated blank in such a test station.

However, such an inspection scanner can also be attached directly to the cutting robot, in particular to its tool, especially its tool base body, in such a way that it can check the edges of the blank after it has been cut out.

Preferably, the blank separating device also includes a blank magazine, in which—preferably by the separating robot—already separated blanks are deposited. The supply of separated blanks there serves to bridge interruptions in the separating operation, for example when the supply station has to be reloaded.

With regard to a packaging machine comprising a blank separator for separating blanks connected by micro-joints from a die-cut sheet, it will preferably also comprise a cardboard box erector for producing a three-dimensional cardboard box from the flat blank.

Preferably, the blank separating device is designed according to the above description.

Preferably, such a packaging machine can also have one or more transfer units, for example robots, to transfer the individual blanks or even entire groups of blanks from the blank separating device to the infeed conveyor to a cardboard box erector or to feed the blank directly into the cardboard box erector and, in particular, also erect it therein and fix it in its three-dimensional configuration.

In this case, the transfer unit or the infeed conveyor to the erector can simultaneously be designed as an alignment unit for aligning the blank to a predetermined target position on the infeed conveyor or erector, which then no longer needs to be present as a separate component.

EXAMPLES OF EMBODIMENTS

Figure 1B:
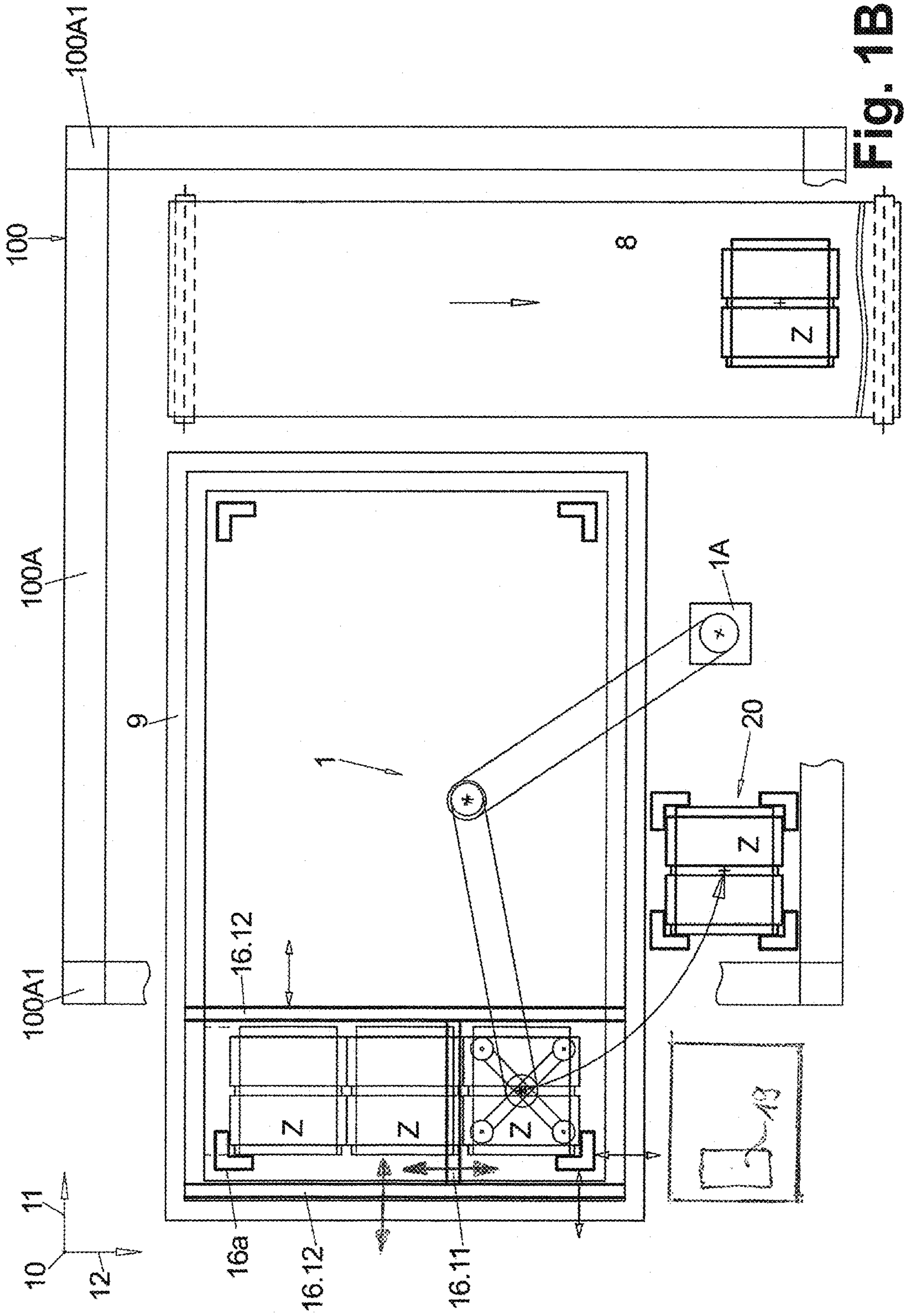
Figure 2A:
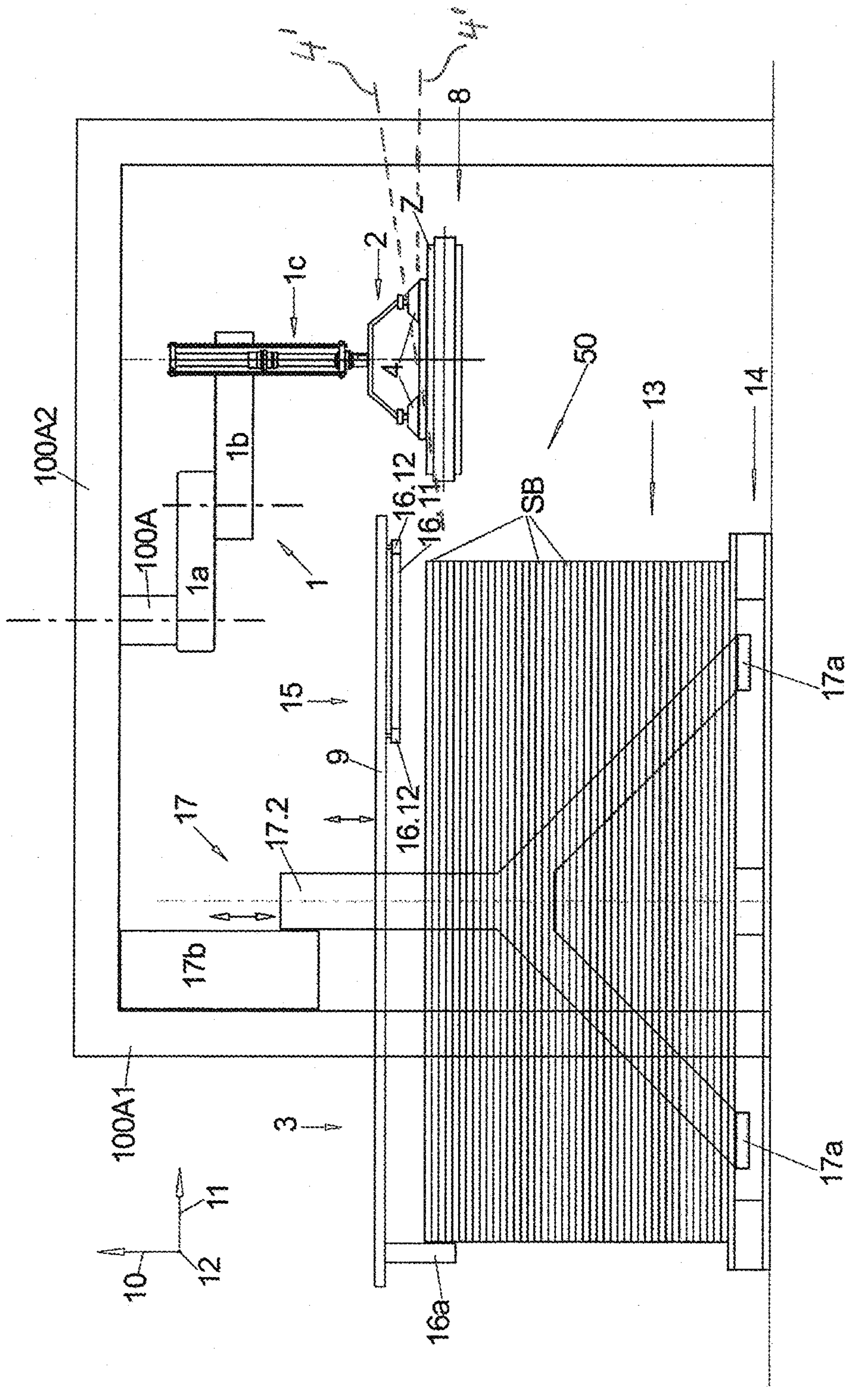
Figure 2B:
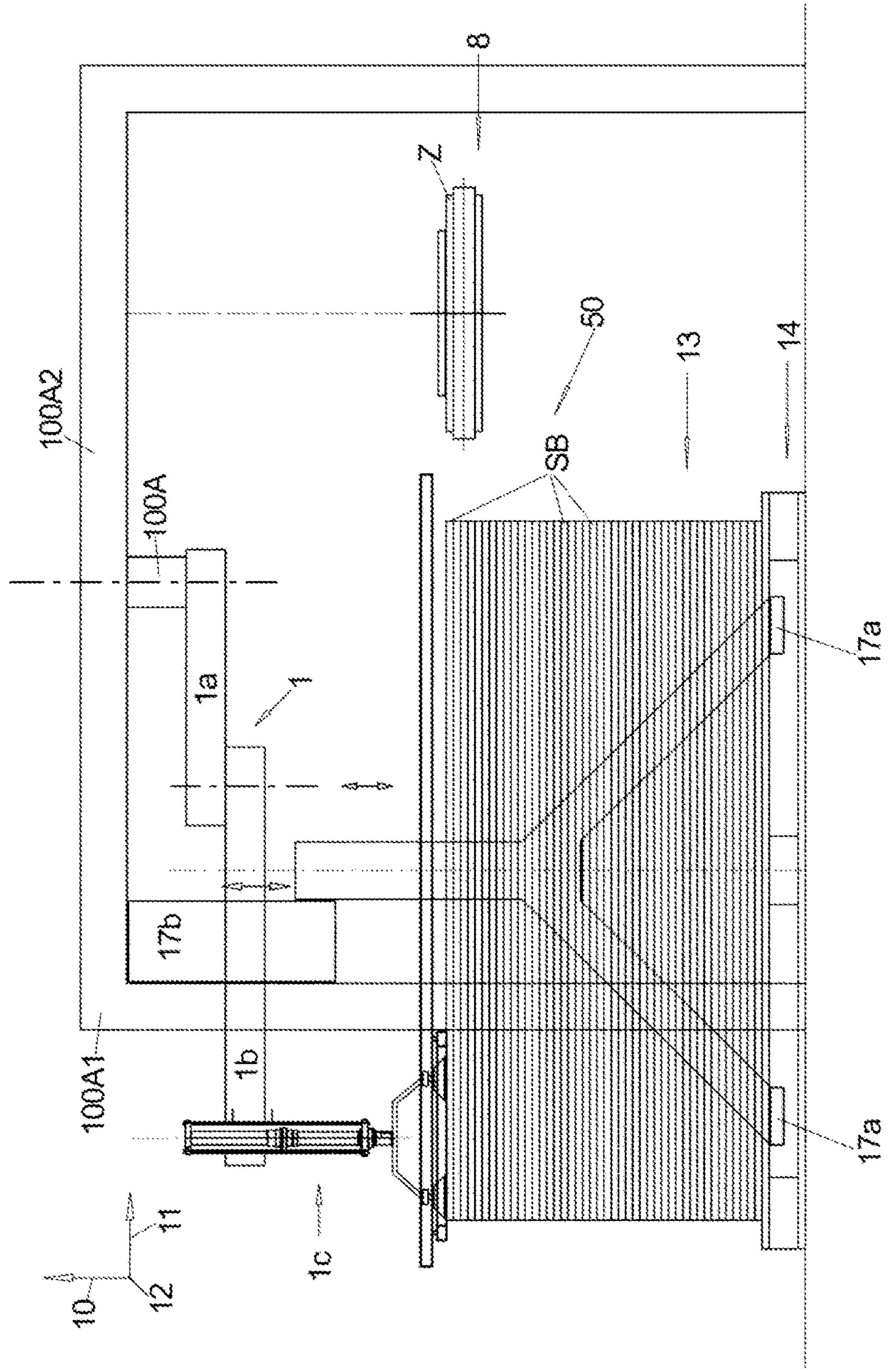
Figure 3A:
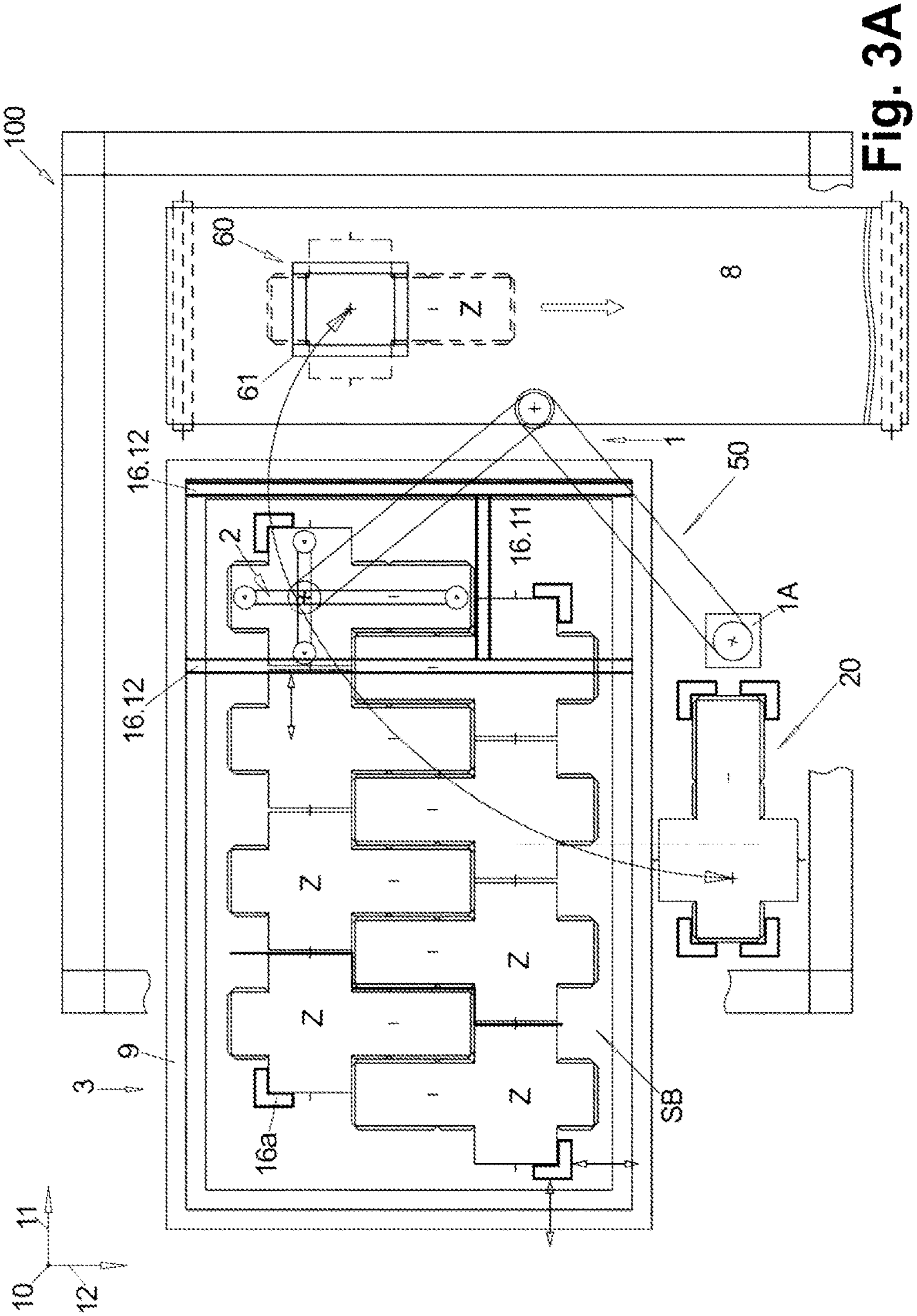
Figure 3B:
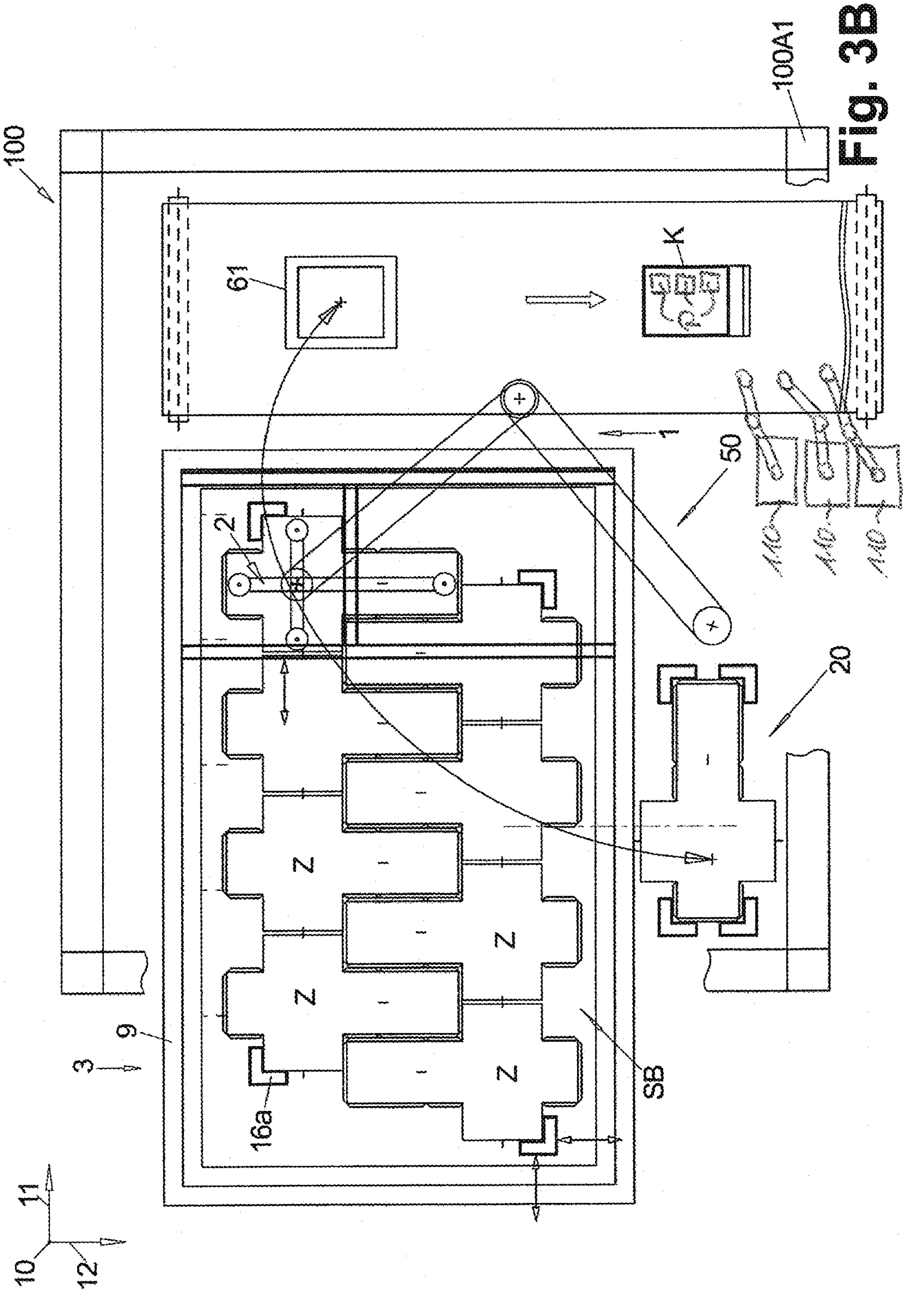
Figure 4A:
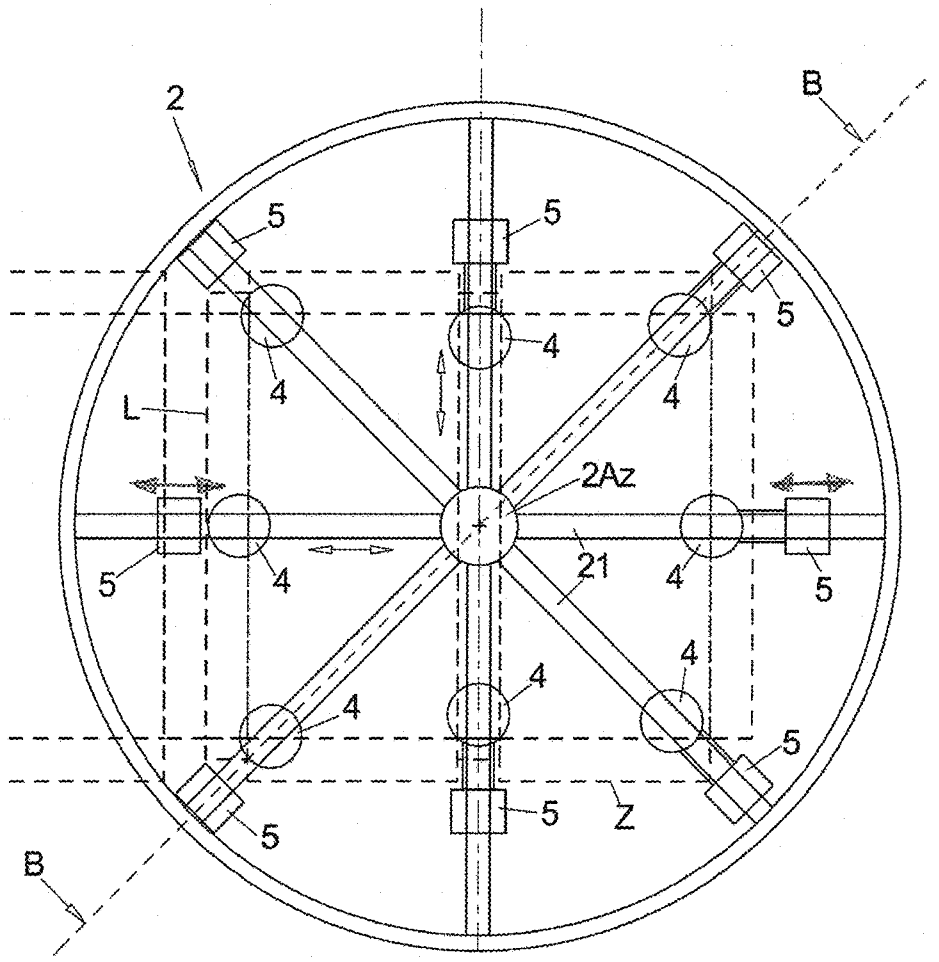
Figure 4B:
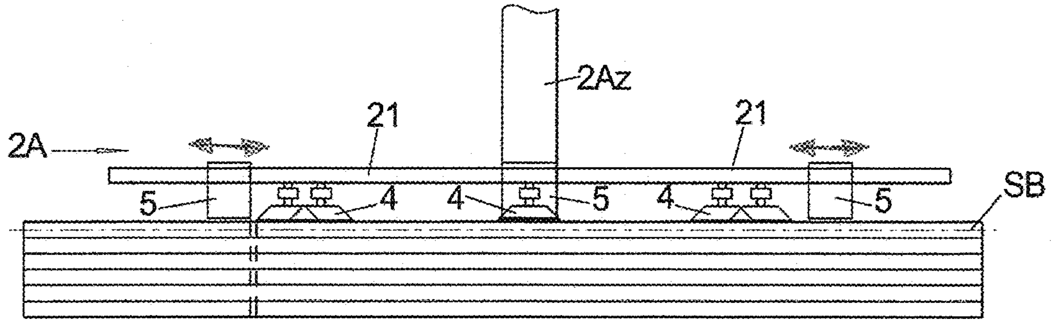
Figure 5A:
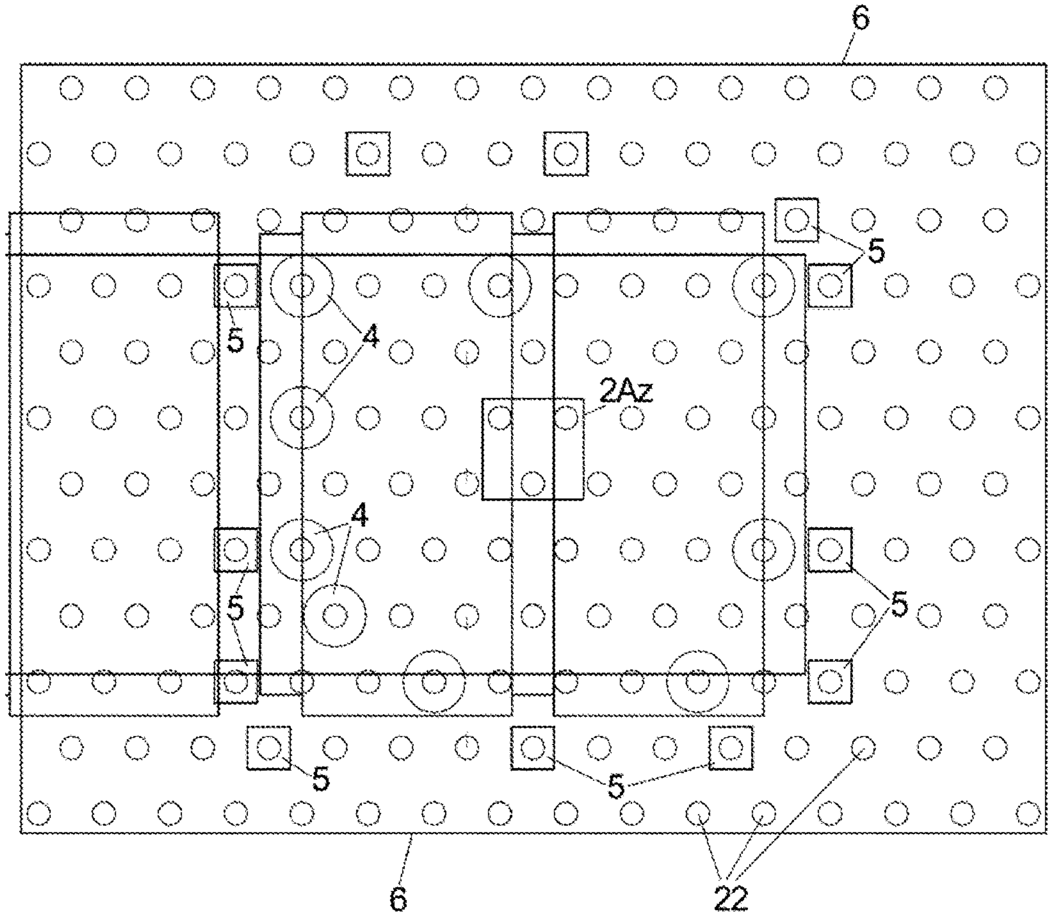
Figure 5B:
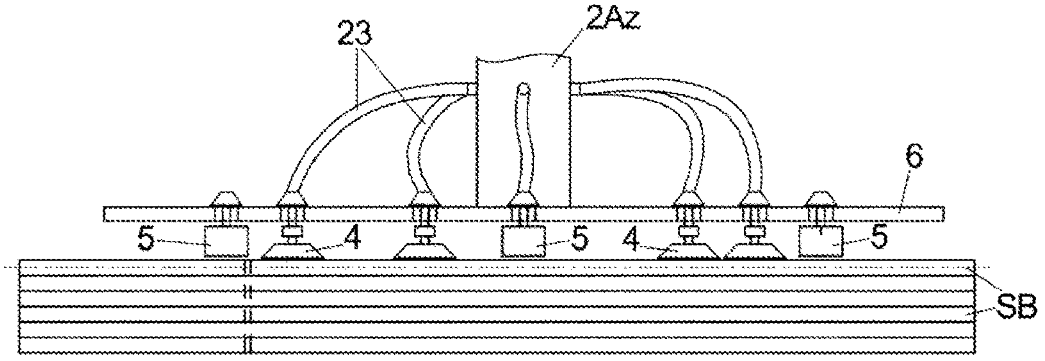

Embodiments according to the invention are described in more detail below by way of example. In the drawings:

FIGS. 1*a, b*: show a first design of the separating device in the top view in different functional positions, FIGS. 2*a, b*: show the separating device of FIGS. 1*a, b* in the same functional positions in side view, FIGS. 3*a, b*: show a second design of the separating device in the top view in different functional positions, FIGS. 4*a, b*: show a first design of the gripping tool in top view and side view, FIGS. 5*a, b*: show a second design of the gripping tool in top and side view, FIGS. 1*a*, 2*a* show a top view and a side view, the latter in the direction opposite to the direction of passage through the packaging machine 100, of the separating device 50 in its installed state in the packaging line 100 in a first operating position, and in FIGS. 1*b*, 2*b* in a second operating position.

The blank separating device 50 comprises, on the one hand, a supply station 3 and, on the other hand, a separating robot 1 with a gripping tool 2 on its robot arm for gripping and lifting a single blank Z from the uppermost stamping sheet SB of the stack 13 of stamping sheets, which is delivered on a Euro pallet 14 and is moved into and inserted into the supply station 3.

As FIGS. 1*a, b* show, the stack 13 is inserted into the interior of a module of the packaging machine 100 from the side, so that it stands with its longitudinal direction 11 transverse to the throughput direction 100' of the packaging machine 100 and still protrudes to the side from the base frame 100A of the module.

The robot 1 is here a serial robot, which is suspended with its robot base 1A in the upper area on the base frame 100A of the machine tool 100.

The machine tool 100 consists of several modules arranged one behind the other in the throughput direction 100', each consisting of the same base frame 100A, each consisting of four columns 100A1 arranged in a square, the upper ends of which are connected to each other by longitudinal cross members 100A3 and cross members 100A2 running in the throughput direction 100.

The robot 1 is suspended by its robot base 1A from one of the crossbars 100A2 of a base frame 100A or an additional crossbar, and its upper arm 1*a* is pivotable relative to the robot base 1A about an upright pivot axis.

At the free end area of the upper arm 1*a*, the lower arm 1*b* can also be swivelled about an upright axis, which carries a vertical crossbar 100*c* in its free end area, which can be moved in height to a limited extent in relation to the lower arm 1*b* and carries a gripping tool 2 at its lower end, shown here with two suction cups 4.

Due to the only limited height adjustment of the vertical traverse 1*c* and thus also of the suction cups 4, the height of the dismantling stack 13, in particular its uppermost punching sheet SB, must be tracked, which is why a lifting device 17 is provided.

This can engage under the top plate of the pallet 14 on both sides of the stack 13 including pallet 14 that has been moved into the supply station 3 with a respective lifting arm 17.1, 17.2, which forks downwards and has short tines 17*a* projecting towards the other lifting arm at the lower end, in order to lift the entire pallet 14. For this purpose, the upper part of each of the lifting arms 17.1, 17.2 or both together is guided on a lifting guide 17*b* and can be raised by motor.

In order to prevent the rest of the top sheet SB from being lifted when one of the blanks Z is gripped and lifted by the separating robot 1 and its gripping tool 2, which would result in an uncontrolled tearing off of the micro-joints M, the adjacent blanks Z on the top side of the stack 13 are held down by means of a holding-down device 15.

In this case, the hold-down device 15 consists of a hold-down frame 9 which is rectangular in plan view and whose inner free space is in particular larger than the largest stack 13 to be accommodated, usually larger than a Euro pallet 14.

Inside the frame 9, two hold-down bars 16.12 are guided, which are variable in their distance and run in the transverse direction 12 of the stack 13, and can be adjusted, in particular, by motor drive or manually.

Between these two hold-down bars 16.12, a length-adjusting hold-down bar 16.11 running in the other horizontal transverse direction 11 is attached, which runs in the longitudinal direction 11 of the stack 13 and is adjustable in its transverse direction 12, i.e. can be moved along the hold-down bar 16.12, in particular can be moved in an automatically controlled manner.

Before lifting the blank Z to be separated, these hold-down bars are positioned as close as possible to the outside of the parting lines L between the adjacent blanks Z when viewed from above, and likewise the suction cups 4 of the gripping tool 2 are positioned as close as possible to and inside the blank Z at the parting lines L.

When the blank to be separated is lifted, the hold-downs 15 are and remain lowered until they are in contact with the uppermost punching sheet SB, which is why the hold-down, in this case in particular the hold-down frame 9, is adjustable in height in a controlled manner, in particular here fixed either to the lifting arms 17.1, 17.2 or directly to its own lifting guide fixed to the base frame 100A of the machine tool.

In the present case, there is sufficient space between the supply station 3, i.e. the set stack 13, and the opposite longitudinal side of the base frame 100A to arrange a discharge conveyor 8 running in the throughput direction 100', on which the separating robot 1 deposits the separated blank Z in each case, as is only indicated in FIG. 1*a* and takes place in FIG. 2*a*.

FIGS. 1*b*, 2*b*, on the other hand, show how a blank Z already lying on the discharge conveyor 8 is removed from the latter, while the robot 1 with its gripping tool 2 just grips one of the last three blanks Z forming a row, which, viewed from above, are already outside the base frame 100A of this module of the packaging machine 100, the hold-down device 15 with its hold-down bar 16.11, 16.12 is set in such a way that the blank Z adjoining in the transverse direction 12 of the stack 13 is held down by the hold-down bar 16.11, while the two hold-down bars 16.12 running in the transverse direction 12 are already out of function, since there is no longer a stamping sheet there on which they can rest.

Also when blanks Z are picked up at other positions of the punching sheet, one of these hold-down bars 16.2 is usually out of function insofar as it no longer rests on the punching sheet but only serves to guide the hold-down bar 16.11 running in the other direction.

FIGS. 1*a, b* also show, viewed from above, in this case angular stack aligners 16*a*, which are preferably also attached to the hold-down frame 9, are in any case part of the supply station 3 and extend downwards from above—as shown by way of example in FIG. 2*a*—to such an extent that at least the uppermost or some of the uppermost stamping sheets SB are held in position between the stack aligners 16*a*, which can be positioned exactly, which can be adjusted relative to the hold-down frame 9, preferably in the longitudinal direction 11 as well as in the transverse direction 12 of the inserted stack, either manually or automatically controlled, so that the robot 1 knows the exact actual position of the uppermost stamping sheet SB.

FIGS. 1*a, b* also show—omitted in FIGS. 2*a, b* for reasons of clarity—a blank magazine 20 in which the separating robot 1 can deposit a separated blank Z instead of depositing it directly on the discharge conveyor 8 and feeding it into the packaging process.

If the function of the blank separating device 50 is interrupted, for example because a new full pallet 14 has to be placed in the supply station 3, the separating robot 1 can bridge this time by removing blanks from the blank magazine 20 and placing them on the discharge conveyor, thus continuing to supply the packaging machine with separated blanks.

Whereas in FIGS. 1*a, b* the blanks Z were essentially rectangular and arranged next to each other in rows and columns, the views of FIGS. 3*a, b* show blanks Z that are strongly cross-shaped and partially overlap each other both in the longitudinal direction 11 and in the transverse direction 12 of the stamping sheet, so that this causes multiple angled separating lines L between the individual blanks. Accordingly, two hold-down bars crossing each other at right angles can never run along the entire parting line, but only over partial areas of the parting lines.

If this is not sufficient, instead of the straight hold-down bars e.g. 16.11, hold-down bars 16.11, 16.12 adapted to the specific shape of the blank and also angled or having an angled edge can be used.

FIGS. 3*a, b* further differ from FIGS. 1*a, b* in that the separating robot 1 does not simply place the separated blank Z on the discharge conveyor 8 for transport away, but there is an erector 60 with the erecting die 61 above the discharge conveyor 8, and the robot 1 places the blank Z at least in the exact position on the erector 60, or even presses it through the die 61 until it is standing underneath on the discharge conveyor 8 in the erected state.

However, before pressing through, it must be ensured that the gripping tool 2 does not project laterally beyond the bottom section of the blank Z at any point when viewed from above, or a corresponding pressing tool must be extendable from the underside of the base body 2*a* of the gripping tool 2 as a pressing plunger.

The problems with adapting hold-downs along, for example, the hold-down frame 9, which surrounds the entire stack 13 when viewed from above, can be avoided or minimised if the hold-downs are arranged directly on the base body 2A of the gripper tool 2 and are adjustable there, as shown in the two designs of FIGS. 4*a, b* and 5*a, b:*

In the design according to FIGS. 4*a, b*, spokes 21 project radially from the central part 2Az of the base body 2A, in this case 8 spokes distributed evenly over the circumference, which are connected at their outer ends by a circumferential ring for stabilisation.

Along the spokes 21, i.e. in the radial direction, both a suction cup 4 and a hold-down 5 are attached and adjustable, their lower contact surfaces being approximately at the same height.

In the right half of FIG. 4*a*, including the spokes 21 extending exactly upwards and downwards in FIG. 4*a*, the respective suction cup 4 is connected to the respective hold-down 5 located radially outside it to form a fixed unit, i.e. at a fixed radial distance.

This functional unit is then set for the respective blank Z in such a way that the suction cup 4 is located just inside the blank Z—as seen from above—and the hold-down 5 just outside.

Since, depending on the course of the circumferential line of the blank Z to be separated, this does not always result in the optimally small distance to the circumference, the suction cups 4 and hold-down devices 5 lying outside of them can alternatively be moved independently of each other along the three spokes 21 pointing to the left, which—as can be seen in particular from the spoke 21 pointing exactly to the left—enables very close positioning of the suction cup 4 inside and of the hold-down device 5 outside of the circumferential line of the blank Z.

As a rule, these settings are only carried out manually once before the start of processing a batch of blanks Z.

In contrast, the design of FIGS. 5*a, b* shows a design in which the base body 2A of the gripping tool 2 consists of a perforated plate as a suction cup support plate 6, which—like the spoke wheel in FIGS. 4*a, b*—is larger than a blank Z to be grip.

Both the hold-down device 5 and the suction pad 4 are designed in such a way that they can be inserted into one of these holes 22, in particular from below, and in particular lock into place therein.

During suction, the suction cups move upwards and/or the hold-downs move downwards, causing the micro-joints to be torn off.

In this way, the suction cups 4 on the one hand and the hold-downs 5 on the other hand can be positioned just inside or just outside the circumferential line L of the blank Z to be handled, and then the suction cups 4 can be connected to the central part 2Az of the base body 2*a* for vacuum supply only by means of—preferably plug-in—hoses for vacuum supply.

REFERENCE LIST

1 Separating robot
1A Robot base
1Az Base body central area
1*a* Upper arm
1*b* Lower arm
1*c* Vertical brace
2 Gripping tool
2A Base body
3 Supply station
3A Base frame
4 Top grippers, suction cups
4' Suction level
5 Suction arm
6 Suction cup support plate

7 Fastening device, through-opening
8 Conveyor
9 Hold-down frame
10 Vertical
11 Longitudinal direction of stamping sheet
12 Transverse direction punching sheet
13 Stack
14 Pallet
15 Hold-down
15' Hold-down plane
Hold-down bar
15.11, 15.12 Supply aligner
16 Stop
**16*a*** Lifting device
18 Position scanner
19 Test scanner
20 Blank magazine
21 Spoke
22 Passage opening
23 Hose
50 Blank separating device
50* Control
60 Cardboard box erector
61 Matrix
100 Packaging machine
100' Direction of flow, longitudinal
100A Base frame
100A1 Column
100A2 Crossbar
100A3 Longitudinal crossbar
112 Running direction 102
K Cardboard
L Dividing line
M Micro-connection, nominal tear point
P Product
SB stamping sheet
SB' stamping sheet plane
Z Blank

The invention claimed is:

1. Blank separating device (50) for separating flat blanks (Z), in particular of cardboard material, for producing dimensionally stable outer packaging such as cardboard boxes (K), with a supply station (3) in which a, in particular vertical, stack (13) of, in particular, plate-shaped stamping sheets (SB), each having a plurality of blanks (Z) lying in one plane, adjoining one another and connected to one another via predetermined tearing points (M), in particular micro-connections (M), is kept, a robot (1) for removing at least one blank of an uppermost stamping sheet (SB), in particular from the supply station (3), a controller (50*) for controlling at least all moving parts of the blank separating device (50), wherein the robot (1) is designed as a separating robot with a corresponding top-side gripping tool (2) for gripping a top side of the at least one blank only, the top-side gripping tool (2) being capable of gripping only one or a group of several, in particular still connected, blanks (Z) from the interconnected blanks (Z) of the uppermost stamping sheet (SB) and separating the blank (Z) or the group of blanks (Z) by lifting it off from the stack and thereby tearing off the predetermined tearing points (M) towards at least one adjacent blank (Z) of a remainder of the uppermost stamping sheet (SB), at least one hold-down device (15) is provided for preventing the remainder of the uppermost stamping sheet (SB) from lifting off when the blank (Z) or the group of blanks (Z) gripped by the separating robot (1) is lifted.

2. Blank separating device according to claim 1, wherein the top-side gripping tool (2) has as gripper one or more top-side grippers, in particular adhesion grippers or suckers (4), arranged in particular in a horizontal gripping plane (4'), the position of the top-side grippers (4) on a tool base body (2A) is adjustable, in particular when viewed from above, the position of the top-side grippers (4) is radially adjustable, in particular with respect to a central area (2Az) of the tool base body (2A).

3. Blank separating device according to claim 2, wherein each top-side gripper (4) is attached to a radially extending spoke (21) and is adjustable in position along the spoke (21)

or the tool base body (2A) comprises a top-side gripper support plate (6) with a plurality of fastening devices for top-side grippers (4) arranged in particular radially as well as circumferentially around the central area of the base body (2A).

4. Blank separating device according to claim 2, wherein the robot (1) or the top-side gripping tool (2) is designed in such a way that, after activation of the top-side grippers (4), a gripping plane (4') can be adjusted to an oblique position relative to the horizontal (11+12)

and/or the top-side gripping tool (2) is designed in such a way that the individual top-side grippers (4) can be activated in a controlled manner in a specific sequence, individually or in groups and/or the top-side gripping tool (2) is designed in such a way that top-side grippers (4) can be displaced upwards from the gripping plane (4') individually or in groups in a controlled manner, in particular in such a way that each top-side gripper (4) is displaced upwards from the gripping plane (4') during activation, either simultaneously or with a time delay.

5. Blank separating device according to claim 2, wherein each top-side gripper (4) is associated with a hold-down device (5), in particular, a hold-down device (5) positioned radially further outwards with respect to the basic tool body (2A) is attached to each top gripper (4).

6. Blank separating device according to claim 1, wherein with several hold-down devices (15)

either the undersides of the hold-down devices (15) lie in a common horizontal hold-down plane (15')

or the hold-down devices are designed in such a way that they can adapt to an uneven, in particular sagging, top side of the stack.

7. Blank separating device according to claim 1, wherein the at least one hold-down device (15) is movably attached to a base frame (3A) of the supply station (3), and is movable in a vertical (10) as well as in at least one of the horizontal transverse directions (11, 12), and is in particular a hold-down frame (9) having hold-down bars (16.11, 16.12) extending in one or both horizontal transverse directions (11, 12), the hold-down bars (16.11, 16.12) being adjustably mounted in the hold-down frame (9) thereby being movable in at least one, preferably both, transverse directions (11, 12), in particular the hold-down bars (16.11, 16.12) are automatically adjustable in a controlled manner.

8. Blank separating device according to claim 1, wherein the at least one hold-down device (5) is fixed to a tool base body (2A) of the robot tool (2), in particular several hold-down devices (5) are arranged so as to be adjustable in their position relative to the tool base body (2A).

9. Blank separating device according to claim 1, wherein the supply station (3) comprises a mechanical supply aligner (16) which holds and/or brings at least the uppermost stamping sheet (SB), in particular the entire stack (13), into a desired position in two horizontal directions (11, 12) by means of lateral stops (16*a*-*d*) which are adjustable, in particular adjustable in a controlled manner.

10. Blank separating device according to claim 9, wherein the mechanical supply aligner (16) is arranged either on the supply base frame (3A)

or on the hold-down frame (9)

or on the tool base body (2A).

11. Blank separating device according to claim 1, wherein the supply station (3) or the separating robot (1) comprises a non-contact position scanner (18) for the position of the uppermost stamping sheet (SB) in the horizontal plane relative to the supply base frame, the separating robot is connected to the position scanner by data, in particular via the control system, so that the position of the blank (Z) to be gripped is known to the separating robot and it can grip the blank (Z) in targeted manner.

12. Blank separating device according to claim 1, wherein a blank magazine (20), in particular one that is open upwards or to the side, is present in such a position that the separating robot (1) can deposit a blank (Z) held by it therein.

13. Blank separating device according to claim 1, wherein a non-contact inspection scanner (19) is present which checks the separated blank (Z) for quality features, in particular its shape and/or size and/or quality of its outer edges and/or quality of its printing and/or motif of its printing, in particular the inspection scanner (19)

is either at an inspection station separate from the supply station (3) and the blank magazine (20), which is arranged in particular downstream of the supply station (3) and/or upstream of the blank magazine (20)

or is arranged on the separating robot (1), in particular on the tool base body (2A).

14. Blank separating device according to claim 1, wherein the supply station comprises a lifting device (17) which guides the entire stack (13), in particular including the container (14) on which it rests, in height according to the decreasing height of the stack (13), so that the uppermost blank (Z) is always at approximately the same height.

15. Packaging machine (100) for inserting and packaging products (P) in a dimensionally stable outer packaging, in particular a cardboard box (K), with a cardboard box erector (60) for producing a cardboard box (K) from a flat blank (Z) of cardboard material, a plurality of transfer robots (110) along a transfer path for transferring products (P) into cardboard boxes (K), wherein the packaging machine comprises a blank separating device (50) according to claim 1.

16. Packaging machine according to claim 15, wherein the packaging machine comprises a transport system (8) leading through the packaging machine (100) and a blank magazine (20), the blank separating device (50) and/or the separating robot (1) is positioned in the packaging machine (100) in such a way that it can deposit a separated blank or a group of separated blanks (Z) held by it directly on the transport system (8), or optionally also in the blank magazine (20).

17. Packaging machine according to claim 16, wherein the packaging machine (100) comprises a transfer device (110), in particular a transfer robot (110), for transferring one or more individual blanks (Z) from the blank magazine to the cardboard box erector (60) or a feed conveyor to the cardboard box erector (60), the transfer device (110) or the feed conveyor is designed as an alignment unit for aligning the blank to a predetermined target position.

18. Method for producing separated blanks (Z)

from a stack (13) of, in particular plate-shaped, stamping sheets (SB) with several blanks (Z) lying approximately in one plane and adjoining one another, connected to one another via predetermined tearing points (M), in particular micro-joints (M), in particular by means of a blank separating device (50), wherein one or more blanks (Z) from an uppermost or foremost stamping sheet (SB), in particular one lying on the stack, are automatically gripped and moved out of the sheet plane thereof by a separating robot of a blank separating device (50) while tearing off the predetermined tearing points (M), the separating robot having a top-side gripping tool (2) that grips a top side of the one or more blanks (Z) only, a remainder of the uppermost or foremost stamping sheet (SB) is automatically kept on the stack.

19. Method according to claim 18, wherein the blanks (Z) are printed ready for use on at least one side, in particular before being separated from the uppermost or foremost stamping sheet (SB).

20. Method according to claim 18, wherein when grasping and moving out of the sheet plane (SB')

the blank (Z) is held non-positively on its upper side, in particular by means of suction force and/or the remainder of the uppermost or foremost stamping sheet (SB) around the blank (Z) is thereby automatically held in the sheet plane (SB').

21. Method according to claim 18, wherein before gripping and lifting out the blank (Z)

the uppermost or foremost stamping sheet (SB) is brought into a predetermined target position in the horizontal plane.

22. Method according to claim 18, wherein the stamping sheets, in particular the uppermost or foremost stamping sheet (SB), are or is selected in a standard size.

23. Method of operating a packaging machine (100) including the separation of blanks (Z) according to claim 18, wherein the stack (13) of stamping sheets(S) is placed in a supply station (3) together with a delivery container, in particular a pallet (14) on which the stack (13) stands and/or in addition to the stack (13) of stamping sheets (SB), a supply of separated blanks (Z) is kept available to bridge standstill times of the blank separating device (50).

* * * * *